(12) United States Patent
Watanabe et al.

(10) Patent No.: US 7,769,760 B2
(45) Date of Patent: Aug. 3, 2010

(54) INFORMATION PROCESSING APPARATUS, METHOD AND PROGRAM THEREOF

(75) Inventors: Akihiro Watanabe, Kanagawa (JP); Tatsuya Narahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 324 days.

(21) Appl. No.: 11/900,165

(22) Filed: Sep. 10, 2007

(65) Prior Publication Data

US 2008/0065659 A1  Mar. 13, 2008

(30) Foreign Application Priority Data

Sep. 12, 2006  (JP)  ............................. 2006-246877

(51) Int. Cl.
*G06F 7/00* (2006.01)
*G06F 17/30* (2006.01)
(52) U.S. Cl. .................... 707/737; 707/740; 707/778
(58) Field of Classification Search ................. 707/100
See application file for complete search history.

(56) References Cited

U.S. PATENT DOCUMENTS

| 6,105,022 | A | * | 8/2000 | Takahashi et al. | ................. | 1/1 |
|---|---|---|---|---|---|---|
| 6,385,619 | B1 | * | 5/2002 | Eichstaedt et al. | ....... | 707/104.1 |
| 6,393,427 | B1 | * | 5/2002 | Vu et al. | ..................... | 707/101 |
| 6,446,083 | B1 | * | 9/2002 | Leight et al. | ............. | 707/104.1 |
| 7,062,498 | B2 | * | 6/2006 | Al-Kofahi et al. | ........... | 707/101 |
| 7,370,059 | B2 | * | 5/2008 | Geraud | ....................... | 707/102 |
| 7,567,961 | B2 | * | 7/2009 | Yang-Stephens et al. | ........ | 707/5 |
| 2003/0154180 | A1 | * | 8/2003 | Case et al. | ..................... | 707/1 |
| 2004/0199529 | A1 | * | 10/2004 | Clark et al. | .................. | 707/100 |
| 2005/0240572 | A1 | * | 10/2005 | Sung et al. | ..................... | 707/3 |
| 2006/0010029 | A1 | * | 1/2006 | Gross | ......................... | 705/10 |
| 2006/0010129 | A1 | * | 1/2006 | Numata | ........................ | 707/6 |
| 2006/0282442 | A1 | * | 12/2006 | Lennon et al. | .............. | 707/100 |
| 2007/0038655 | A1 | * | 2/2007 | Bronstad et al. | ............ | 707/100 |
| 2007/0271291 | A1 | * | 11/2007 | Acharya | ..................... | 707/102 |

* cited by examiner

*Primary Examiner*—Don Wong
*Assistant Examiner*—Binh V Ho
(74) *Attorney, Agent, or Firm*—Frommer Lawrence & Haug LLP; William S. Frommer; Thomas F. Presson

(57) ABSTRACT

An information processing apparatus that has an identification unit for identifying categories to which contents belong among predetermined categories based on metadata indicating the details of the contents. The processing apparatus also includes a clustering unit for classifying a group of contents into clusters by performing clustering processing with respect to the group of contents belonging to the categories based on the metadata.

7 Claims, 15 Drawing Sheets

FIG. 4

| CATEGORY | | CATEGORY DETERMINATION KEYWORD | | |
|---|---|---|---|---|
| CATEGORY SECTION 1 | CATEGORY SECTION 2 | KEYWORD 1 | KEYWORD 2 | KEYWORD 3 |
| NEWS | FIXED TIME/SYNTHESIS | | | |
| | WEATHER | | | |
| | SPECIAL TOPIC/DOCUMENTARY | | | |
| | POLITICS/DIET | DIPLOMACY | POLICY | PRIME MINISTER |
| | ECONOMY/MARKET CONDITION | ECONOMY | STOCK MARKET | TOKYO STOCK EXCHANGE |
| | FOREIGN COUNTRIES/INTERNATIONAL | | | |
| | COMMENTS | | | |
| | DEBATE/MEETING | DEBATE | | |
| | SPECIAL NEWS PROGRAM | | | |
| | LOCAL/DISTRICT | | | |
| | TRAFFIC | | | |
| | OTHERS | | | |
| SPORTS | NEWS | | | |
| | BASEBALL | MLB | PROFESSIONAL BASEBALL | MAJOR LEAGUE |
| | SOCCER | J LEAGUE | FIFA WORLD CUP | PREMIER LEAGUE |
| | GOLF | | | |
| | COMBAT SPORTS | K-1 | | |
| | OLYMPIC/INTERNATIONAL TOURNAMENT | | | |
| | ATHLETIC/MARATHON | MARATHON | RELAY ROAD RACE | |
| | SWIMMING | | | |
| | MOTORSPORTS | | | |
| | MARINE SPORTS | DIVING | | |
| | WINTER SPORTS | SNOWBOARD | FIGURE SKATING | |
| | HORSE RACE/GOVERNMENT-CONTROLLED GAMBLING | HORSE RACE | BOAT RACE | BICYCLE RACE |
| | VOLLEYBALL | VOLLEYBALL | VOLLEY | V LEAGUE |
| | TENNIS | TENNIS | WIMBLEDON | |
| | BASKETBALL | BASKETBALL | NBA | |
| | RUGBY | | | |
| | AMERICAN FOOTBALL | AMERICAN FOOTBALL | RICE BOWL | |
| | BOXING | PRIZE FIGHTING | | |
| | PROFESSIONAL WRESTLING | PROFESSIONAL WRESTLING | | |
| | OTHERS | | | |

FIG. 5

| CATEGORY | | | CATEGORY DETERMINATION KEYWORD | | |
|---|---|---|---|---|---|
| CATEGORY SECTION 1 | CATEGORY SECTION 2 | | KEYWORD 1 | KEYWORD 2 | KEYWORD 3 |
| INFORMATION PROGRAM | SHOW BUSINESS/GOSSIP SHOW | | SHOW BUSINESS | GOSSIP SHOW | ENTERTAINMENT |
| | FASHION | | | | |
| | LIVING/HOUSEHOLD | | | | |
| | HEALTH/BEAUTY/MEDICAL CARE | | DIET | YOGA | |
| | SHOPPING/CATALOGUE SELLING | | | | |
| | GOURMET/COOKING | | GOURMET | COOKING | RECIPE |
| | EVENT | | CHRISTMAS | | |
| | OTHERS | | | | |
| DRAMA | HISTORICAL DRAMA | | | | |
| | SUSPENSE/MYSTERY | | | | |
| | OTHERS | | | | |
| MUSIC | INTERNAL POPS | | | | |
| | FOREIGN POPS | | | | |
| | CLASSIC | | CLASSIC | | |
| | JAZZ | | JAZZ | | |
| | POPULAR MUSIC/POPULAR BALLAD | | POPULAR MUSIC | POPULAR BALLAD | |
| | CONCERT | | CONCERT | | |
| | RANKING | | | | |
| | KARAOKE | | KARAOKE | | |
| | KIDS | | | | |
| | FOLK BALLAD | | | | |
| | FOLK MUSIC/WORLD MUSIC | | | | |
| | OTHERS | | | | |
| VARIETY | QUIZ | | QUIZ | | |
| | GAME | | GAME | | |
| | TALK SHOW | | TALK | | |
| | COMIC ENTERTAINMENT/COMEDY | | | | |
| | MUSIC VARIETY | | | | |
| | TRAVEL VARIETY | | | | |
| | COOKING VARIETY | | | | |
| | OTHERS | | | | |

FIG. 6

| CATEGORY SECTION 1 | CATEGORY | | CATEGORY DETERMINATION KEYWORD | | |
|---|---|---|---|---|---|
| | CATEGORY SECTION 2 | KEYWORD 1 | KEYWORD 2 | KEYWORD 3 | |
| MOVIE | FOREIGN FILM | | | | |
| | JAPANESE FILM | | | ENVIRONMENT | |
| | ANIMATION | ANIMATION | | | |
| | ACTION | ACTION | | | |
| | SF/FANTASY | SF | FANTASY | | |
| | COMIC ENTERTAINMENT/COMEDY | COMIC ENTERTAINMENT | COMEDY | | |
| | SUSPENSE/MYSTERY | SUSPENSE | MYSTERY | | |
| | LOVE/ROMANCE | LOVE | ROMANCE | | |
| | HORROR/THRILLER | HORROR | THRILLER | | |
| | WESTERN | WESTERN | | | |
| | YOUTH/SCHOOL/IDOL | YOUTH | SCHOOL | IDOL | |
| | DRAMA/SOCIAL DRAMA | DRAMA | | | |
| | GANGSTER/HISTORICAL DRAMA | HISTORICAL DRAMA | | | |
| | DOCUMENTARY | DOCUMENTARY | | | |
| | ADVENTURE/RISK | ADVENTURE | RISK | | |
| | MUSICAL/MUSICAL FILM | MUSICAL | MUSIC | | |
| | HOME DRAMA | | | | |
| | OTHERS | | | | |
| ANIMATION | INTERNAL ANIMATION | | | | |
| | FOREIGN ANIMATION | | | | |
| | SPECIAL EFFECTS | SPECIAL EFFECTS | | | |
| | OTHERS | | | | |
| DOCUMENTARY | SOCIETY/CURRENT EVENTS | | | WORLD HERITAGE | |
| | HISTORY/TRAVEL | HISTORY | TRAVEL | ENVIRONMENT | |
| | NATURE/ANIMAL/ENVIRONMENT | NATURE | ANIMAL | MEDICAL SCIENCE | |
| | SPACE/CHEMISTRY/MEDICAL SCIENCE | SPACE | SCIENCE | | |
| | CULTURE/TRADITIONAL CULTURE | CULTURE | CIVILIZATION | | |
| | ART AND LETTERS/LITERATURE | ART AND LETTERS | LITERATURE | | |
| | SPORTS | | | | |
| | INTERVIEW/DEBATE | INTERVIEW | DEBATE | CONVERSATION | |
| | OTHERS | | | | |

FIG. 7

| CATEGORY | | CATEGORY DETERMINATION KEYWORD | | |
|---|---|---|---|---|
| CATEGORY SECTION 1 | CATEGORY SECTION 2 | KEYWORD 1 | KEYWORD 2 | KEYWORD 3 |
| THEATER/ PERFORMANCE | HISTORICAL DRAMA/MODERN DRAMA | CONTEMPORARY DRAMA | MODERN DRAMA | DRAMA |
| | MUSICAL | MUSICAL | | |
| | DANCE/BALLET | DANCE | BALLET | |
| | COMIC STORYTELLING/DRAMATIC PERFORMANCE | COMIC STORYTELLING | DRAMATIC PERFORMANCE | |
| | KABUKI/JAPANESE CLASSICS | KABUKI | JAPANESE CLASSICS | |
| | OTHERS | | | |
| HOBBY | JOURNEY | JOURNEY | TRAVEL | HOT SPRINGS |
| | FISHING | FISHING | FISHING | |
| | OUTDOOR | OUTDOOR | | |
| | HORTICULTURE | HORTICULTURE | GARDENING | |
| | PET | PET | | |
| | HANDCRAFT | HANDCRAFT | | |
| | IGO | IGO | | |
| | SHOGI | SHOGI | | |
| | MAH-JONG | MAH-JONG | | |
| | PACHINKO | PACHINKO | | |
| | CAR | CAR | | |
| | MOTORCYCLE | MOTORCYCLE | | |
| | COMPUTER | COMPUTER | PC | |
| | TV GAME | TV GAME | TV GAME | |
| EDUCATION | CONVERSATION/LANGUAGE | ENGLISH CONVERSATION | | |
| | INFANT | CHILD RAISING | | |
| | GRADE SCHOOL CHILDREN | ARITHMETIC | | |
| | JUNIOR HIGH SCHOOL STUDENT | | | |
| | HIGH SCHOOL STUDENT | | | |
| | UNIVERSITY STUDENT/ENTRANCE EXAM | | | |
| | LIFELONG LEARNING/QUALIFICATION | | | |
| | EDUCATIONAL PROBLEMS | EDUCATIONAL PROBLEMS | EDUCATIONAL INNOVATION | |
| | OTHERS | | | |
| WELFARE | ELDERLY | ELDERLY | AGED SOCIETY | |
| | PHYSICALLY HANDICAPPED PEOPLE | PHYSICALLY HANDICAPPED PEOPLE | | |
| | SOCIAL WELFARE | SOCIAL WELFARE | WELFARE | |
| | VOLUNTEER | VOLUNTEER | | |
| | SIGN LANGUAGE | SIGN LANGUAGE | | |

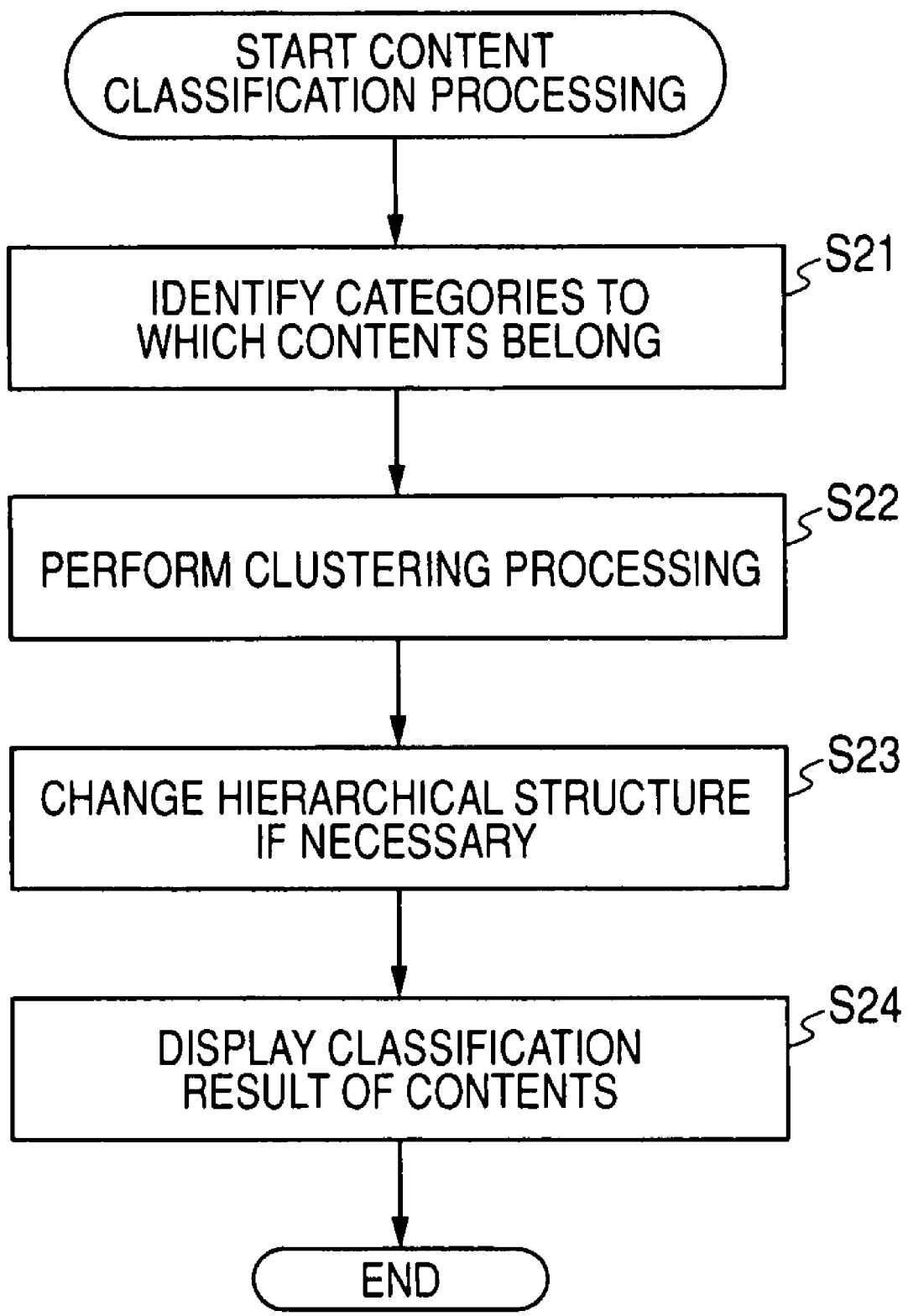

INFORMATION PROCESSING APPARATUS, METHOD AND PROGRAM THEREOF

CROSS REFERENCE TO RELATED APPLICATIONS

The present invention contains subject matter related to Japanese Patent Application JP 2006-246877 filed in the Japanese Patent Office on Sep. 12, 2006, the entire contents of which being incorporated herein by reference.

BACKGROUND OF THE INVENTION

1. Field of the Invention

The invention relates to an information processing apparatus, a method and a program thereof, and particularly, relates to an information processing apparatus, a method and a program thereof which are capable of searching desired contents easily.

2. Description of the Related Art

In recent years, along with popularization of digital broadcasting, Internet and the like, a user can obtain a large amount of contents through broadcast waves, Internet and the like, however, it is difficult for the user to search desired contents with the increase of the amount of contents. It is expected that a technique or a method for easily searching desired contents is realized.

As methods for searching contents in related arts, there are a keyword search and a category search which are generally performed in a multimedia recording/playback apparatus performing recording or playback of contents. In the keyword search, contents relating to a designated keyword can be searched using metadata given to respective contents by designating a keyword such as a title or an artist name. In the category search, contents belonging to a designated category can be searched based on category information given to contents by designating a desired category.

In order to appropriately provide information desired by the user so as to be consistent with user's preference, it is proposed that degrees of preference of the user with respect to information are managed as data of multi-hierarchy structure based on environment in which information is used and categories to which information belongs (for example, refer to JP-A-2001-155038 (Patent Document 1)).

Moreover, it is proposed that thumbnails of respective contents are arranged on a screen to be displayed according to degrees of interest of the user with respect to respective contents and similarities between respective contents (for example, refer to JP-A-2001-229167 (Patent Document 2)).

SUMMARY OF THE INVENTION

The keyword search is effective when the user performs a search with a definite intention, however, when the user performs a search with vague interest or intention, it is difficult to associate a keyword representing one's interest or one's intention, and it is sometimes difficult to search desired contents using the keyword search.

In the category search, it is important that respective contents are appropriately classified, and when the classification of categories is inappropriate or rough, it is difficult to search desired contents. In addition, it is difficult to search a content classified into an abstract category such as "other sports" by designating the category.

The invention of Patent Document 1 is effective when searching information preferred by the user, however, it is difficult to be effective when searching information different from user's preference, or information whose degrees of preference is not accumulated such as information belonging to a new category.

In the invention of Patent Document 2, since the classification of only one hierarchy based on only degrees of relation between contents is performed, it will be difficult to search desired contents with the increase of the number of contents.

Thus, it is desirable to search desired contents easily.

An information processing apparatus according to an embodiment of the invention includes an identification means for identifying categories to which contents belong among predetermined categories based on metadata indicating the details of the contents and a clustering means for classifying a group of contents into clusters by performing clustering processing with respect to the group of contents belonging to the categories based on the metadata.

The information processing apparatus according to an embodiment of the invention allows the clustering means to perform clustering processing by attaching importance to a standpoint of user's preference, further including a hierarchical structure changing means for changing a hierarchical structure so that the clusters reflecting user's preference are arranged in a higher layer in the hierarchical structure including the categories and the clusters.

The information processing apparatus according to an embodiment of the invention allows the clustering means to perform clustering processing by attaching importance to a standpoint of recent topics or trends, including a hierarchical structure changing means for changing a hierarchical structure so that the clusters reflecting recent topics or trends are arranged in a higher layer in the hierarchical structure including the categories and the clusters.

The information processing apparatus according to an embodiment of the invention can further include a display control means for controlling display of the contents so as to classify and display the contents according to the categories and the clusters by using the hierarchical structure including the categories and the clusters.

The information processing apparatus according to an embodiment of the invention can further include a category metadata generation means for generating category metadata indicating the relation between keywords, which are extracted from the metadata of plural contents and used for identifying categories to which the contents belong, and the categories and the identification means identifies the clusters to which the contents belong based on keywords included in the metadata and the category metadata.

An information processing method or a program according to an embodiment of the invention includes a step of identifying categories to which contents belong among predetermined categories based on metadata indicating the details of the contents, and a step of classifying a group of contents into clusters by performing clustering processing with respect to the group of contents belonging to the categories based on the metadata.

According to an embodiment of the invention, categories to which contents belong are identified among predetermined categories based on metadata indicating the details of the contents, and a group of contents is classified into clusters by performing clustering processing with respect to the group of contents belonging to the categories based on the metadata.

As described above, according to an embodiment of the invention, contents can be classified. Also according to the embodiments of the invention, desired contents can be searched easily.

BRIEF DESCRIPTION OF THE DRAWINGS

FIG. 4 is a table showing an example of category metadata;

FIG. 5 is a table showing an example of category metadata;

FIG. 6 is a table showing an example of category metadata;

FIG. 7 is a table showing an example of category metadata;

FIG. 8 is a flowchart for explaining content classifying processing executed by the information processing apparatus of FIG. 1;

DESCRIPTION OF THE PREFERRED EMBODIMENTS

Embodiments of the invention will be described below, and the correspondence between constituent features of the invention and embodiments described in the specification and the drawings is exemplified as follows. The description is made for confirming that embodiments which support the invention are written in the detailed description of the invention. Therefore, if there is an embodiment that is written in the detailed description of the invention but not written here as the embodiment corresponding to a constituent feature of the invention, that does not mean that the embodiment does not correspond to the constituent feature. Conversely, if an embodiment is written here as the embodiment corresponding to a constituent feature, that does not mean that the embodiment does not correspond to a constituent feature other than that constituent feature.

An information processing apparatus (for example, an information processing apparatus 1 in FIG. 1) according to an embodiment of the invention includes, first, an identification means (for example, a category identification unit 71 in FIG. 2) for identifying categories to which contents belong among predetermined categories based on metadata indicating the details of the contents and a clustering means (for example, a clustering unit 72 in FIG. 2) for classifying a group of contents into clusters by performing clustering processing with respect to the group of contents belonging to the categories based on the metadata.

The information processing apparatus according to an embodiment of the invention, secondly, allows the clustering means to perform clustering processing by attaching importance to a standpoint of user's preference, further including a hierarchical structure changing means (for example, a hierarchical structure changing unit 73 of FIG. 2) for changing a hierarchical structure so that the clusters reflecting user's preference are arranged in a higher layer in the hierarchical structure including the categories and the clusters.

The information processing apparatus according to an embodiment of the invention, thirdly, allows the clustering means to perform clustering processing by attaching importance to a standpoint of recent topics or trends, including a hierarchical structure changing means (for example, a hierarchical structure changing unit 73 of FIG. 2) for changing a hierarchical structure so that the clusters reflecting recent topics or trends are arranged in a higher layer in the hierarchical structure including the categories and the clusters.

Figure 1:
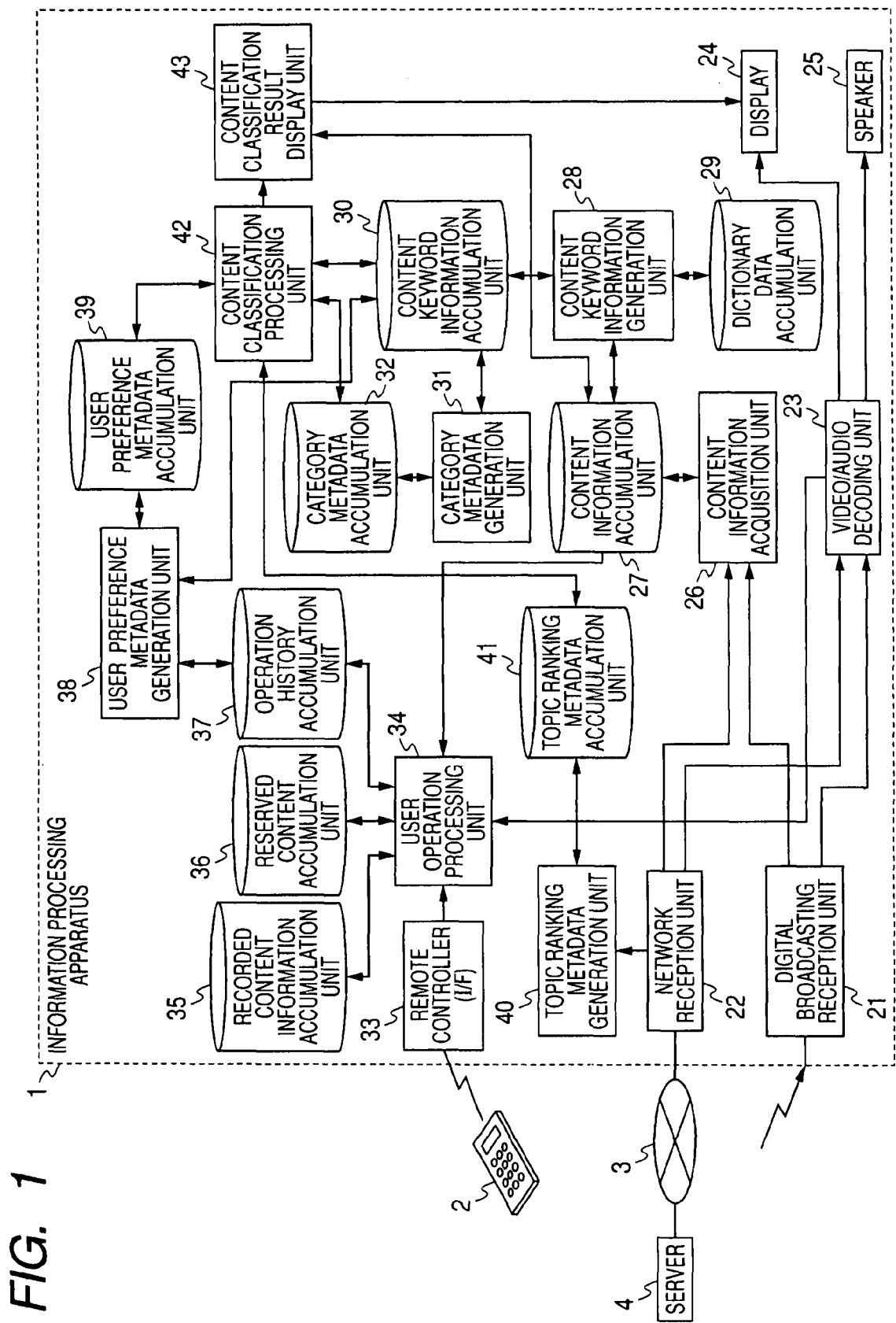
FIG. 1 is a block diagram showing an information processing apparatus according to an embodiment of the invention.

The information processing apparatus according to an embodiment of the invention, fourthly, further includes a display control means (for example, a content classification result display unit 43 of FIG. 1) for controlling display of the contents so as to classify and display the contents according to the categories and the clusters by using the hierarchical structure including the categories and the clusters.

The information processing apparatus according to an embodiment of the invention, fifthly, further includes a category metadata generation means (for example, a category metadata generation unit 31 of FIG. 1) for generating category metadata indicating the relation between keywords, which are extracted from the metadata of plural contents and used for identifying categories to which the contents belong, and the categories and the identification means identifies the clusters to which the contents belong based on keywords included in the metadata and the category metadata.

An information processing method or a program according to an embodiment of the invention includes a step of identifying categories to which the contents belong among predetermined categories (for example, Step S21 of FIG. 8) based on metadata indicating the details of contents, and a step of classifying a group of contents into clusters (for example, Step S22 of FIG. 8) by performing clustering processing with respect to the group of contents belonging to the categories based on the metadata.

Hereinafter, embodiments of the invention will be explained with reference to the drawings.

FIG. 1 is a block diagram showing an information processing apparatus according to an embodiment of the invention.

An information processing apparatus 1 is an apparatus which records or plays back contents such as television programs broadcasted by not-shown broadcast stations and contents transmitted from a server 4 through an internet 3.

The information processing apparatus 1 includes a digital broadcasting reception unit 21, a network reception unit 22, a video/audio decoding unit 23, a display 24, a speaker 25, a content information acquisition unit 26, a content information accumulation unit 27, a content keyword information generation unit 28, a dictionary data accumulation unit 29, a content keyword information accumulation unit 30, a category metadata generation unit 31, a category metadata accumulation unit 32, a remote controller interface (I/F) 33, a user operation processing unit 34, a recorded content information accumulation unit 35, a reserved content information accumulation unit 36, an operation history accumulation unit 37, a user preference metadata generation unit 38, a user preference metadata accumulation unit 39, a topic ranking metadata generation unit 40, a topic ranking metadata accumulation unit 41, a content classification processing unit 42 and a content classification result display unit 43.

The digital broadcasting reception unit 21 receives contents such as television programs broadcasted by digital broadcasting from not-shown broadcast stations and supplies the received content information to the content information acquisition unit 26. The digital broadcasting reception unit 21 also receives EIT (Event Information Table) transmitted from the not-shown broadcast stations to display EPG (Electronic Program Guide) and supplies it to the content information acquisition unit 26 as metadata (hereinafter, referred to as content information) indicating the details of contents. In a short event descriptor defined in the EIT, a program title, detailed information and the like are described, in a content descriptor, a program category and the like are described, and in an extended event descriptor, as more detailed content information, casts, a director and the like are described in the case of, for example, a movie content, and singers, music titles and the like are described in the case of a music content.

The network reception unit 22 receives contents transmitted from the server 4 through the internet 3 and supplies the received contents to the video/audio decoding unit 23. The network reception unit 22 also receives content information transmitted from the server 4 through the internet 3 and supplies it to the content information acquisition unit 26. The content information received through the internet 3 also includes the same information as the EIT described above.

Moreover, the network reception unit 22 also receives information including keywords indicating recent topics or trends (hereinafter, topic ranking information) such as information indicating update information or summaries of respective sites in an RSS (Resource Description Framework Site Summary) format, and ranking data of blogs, which are distributed from portal sites or newspaper sites viewed on the server 4, and supplies the received topic ranking information to the topic ranking metadata generation unit 40.

The video/audio decoding unit 23 decodes the contents acquired from the digital broadcasting reception unit 21 or the network reception unit 22. The video/audio decoding unit 23 also separates the decoded content into video data and audio data, supplies the video data to the display 24 and supplies the audio data to the speaker 25. Furthermore, the video/audio decoding unit 23 supplies the decoded content to the user operation processing unit 34 if necessary.

The display 24 displays video based on the acquired video data.

The speaker 25 outputs audio based on the acquired audio data.

The content information acquisition unit 26 accumulates content information acquired from the digital broadcasting reception unit 21 or the network reception unit 22 in the content information accumulation unit 27.

The content keyword information generation unit 28 extracts keywords relating to contents (hereinafter, referred to as content keywords) from content information accumulated in the content information accumulation unit 27. For example, when content information is a text document like EIT, the content keyword information generation unit 28 performs a morphological analysis of the content information referring to dictionary data accumulated in the dictionary data accumulation unit 29, thereby classifying character strings in the text according to words and extracting important words among them as content keywords. The content keyword information generation unit 28 generates content keyword information having a vector data structure having content keywords as elements with respect to respective contents to accumulate the information in the content keyword information accumulation unit 30 as described later with reference to FIG. 3.

Figure 3:
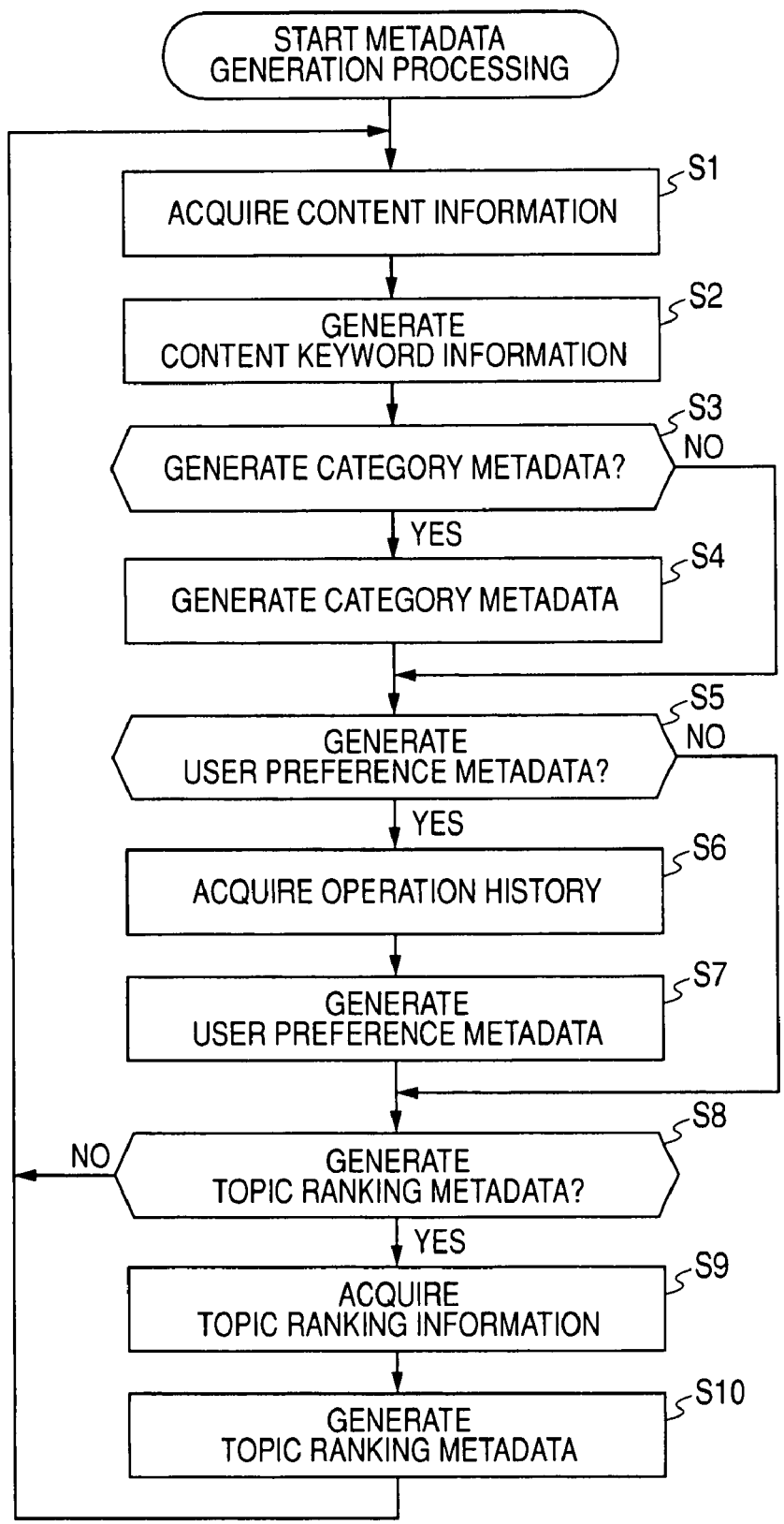
FIG. 3 is a flowchart for explaining metadata generation processing executed by the information processing apparatus of FIG. 1.

The category metadata generation unit 31 generates category metadata indicating the relation between keywords (referred to as category determination keywords) used for identifying categories to which content belong and categories used for classifying contents based on the content keyword information accumulated in the content keyword information accumulation unit 30 as described later with reference to FIG. 3. The category metadata generation unit 31 accumulates the generated category metadata in the category metadata accumulation unit 32.

The remote controller I/F 33 receives various commands inputted by the user by operating a remote controller 2 and supplies information indicating the received command to the user operation processing unit 34.

The user operation processing unit 34 processes various commands from the user. For example, when recording of a content is instructed by the user, the user operation processing unit 34 reads out a content decoded by the video/audio decoding unit 23 and content information accumulated in the content information accumulation unit 26 which correspond to the content whose recording was instructed, and accumulates them in the recorded content information accumulation unit 35. For example, when recording reservation is instructed by the user, the user operation processing unit 34 reads out content information which corresponds to the content whose recording reservation was instructed from the content information accumulation unit 26 and accumulates the information in the reserved content information accumulation unit 36.

The user operation processing unit 34 accumulates information indicating an ID unique to the content showing the content which is the operation object, the operation contents instructed by the user and an operation date and time in the operation history accumulation unit 37 as operation history.

The user preference metadata generation unit 38, as described later with reference to FIG. 3, extracts content keywords (hereinafter, referred to as user preference keywords) relating to contents preferred by the user among the content keywords included in the content keyword information accumulated in the content keyword information accumulation unit 30, based on the operation history accumulated in the operation history accumulation unit 38. The user preference metadata generation unit 38 gives importance having weight according to the degree of user's preference to the extracted user preference keywords. The user preference metadata generation unit 38 generates user preference metadata in which the user preference keywords are associated with the importance, and accumulates the data in the user preference metadata accumulation unit 39.

The topic ranking metadata generation unit 40 extracts keywords plainly representing recent topics or trends (hereinafter, referred to as topic ranking keywords) among the acquired topic ranking information as described later with reference to FIG. 3. The topic ranking metadata generation unit 40 also gives importance having weight according to the degree of representing recent topics or trends to the extracted topic ranking keywords. The topic ranking metadata generation unit 40 generates topic ranking metadata in which topic ranking keywords are associated with the importance, and accumulates the data in the topic ranking metadata accumulation unit 41.

The content classification processing unit 42, as described later with reference to FIG. 8, classifies contents whose content information is stored in the content information accumulation unit 27 based on the content keyword information accumulated in the content keyword information accumulation unit 30, the category metadata accumulated in the category metadata accumulation unit 32, the user preference metadata accumulated in the user preference metadata accumulation unit 39 or the topic ranking metadata accumulated in the topic ranking metadata accumulation unit 41. When the range of contents to be objects of classification is designated by the user and the like, the content classification processing unit 42 classifies contents included in the range.

The content classification result display unit 43, as described later with reference to FIG. 8, acquires results of classification of contents from the content classification processing unit 42 and classifies part or all of the contents whose content information is accumulated in the content information accumulation unit 27 to be displayed on the display 24 by using content information accumulated in the content information accumulation unit 27.

Figure 2:
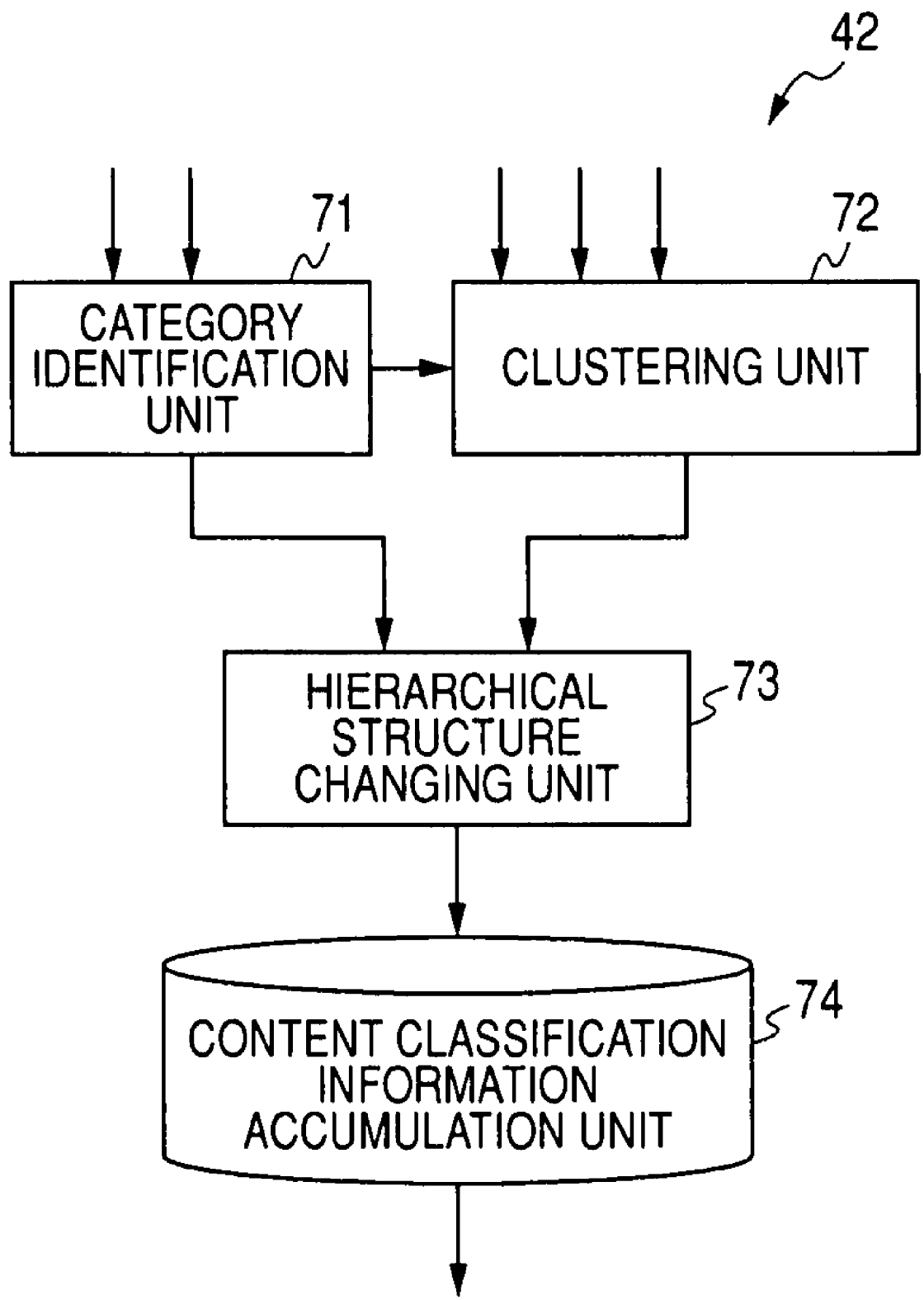
FIG. 2 is a block diagram showing the details of a content classification processing unit of FIG. 1.

FIG. 2 is a block diagram showing the details of the content classification processing unit 42 of FIG. 1. The content classification processing unit 42 includes a category identification unit 71, a clustering unit 72, a hierarchical structure changing unit 73 and a content classification information accumulation unit 74.

The category identification unit 71, as described later with reference to FIG. 8, classifies contents into corresponding categories by identifying categories to which contents belong based on the content keyword information accumulated in the content keyword information accumulation unit 30 and the category metadata accumulated in the category metadata accumulation unit 32. The category identification unit 71 supplies information indicating categories to which contents belong to the clustering unit 72.

The clustering unit 72, as described later with reference to FIG. 8, performs clustering processing with respect to a group of contents belonging to a category classified by the category identification unit 71 while using the user preference metadata accumulated in the user preference metadata accumulation unit 39 or the topic ranking metadata accumulated in the topic ranking metadata accumulation unit 41 if necessary, based on the content keyword information accumulated in the content keyword information accumulation unit 30, thereby classifying the group of contents into clusters. The clustering unit 72 also extracts content keywords indicating features of respective clusters, and sets the keywords as cluster names. The clustering unit 72 supplies contents which belong to respective clusters, names of respective clusters and information indicating attributes of respective clusters to the hierarchical structure changing means 73. As attributes of clusters, for example, information is set, which indicates whether the cluster reflects user's preference, namely, whether it is the cluster to which the contents preferred by the user belong, or whether the cluster reflects recent topics or trends, namely, whether it is the cluster to which contents relating to recent topics or trends belong.

The hierarchical structure changing unit 73, as described later with reference to FIG. 8, changes the hierarchical structure including categories and clusters into a hierarchical structure reflecting user's preference, or recent topics or trends if necessary. The hierarchical structure changing unit 73 accumulates information indicating results in which respective contents are classified into categories and clusters (hereinafter, referred to as content classification information) in the content classification information accumulation unit 74.

Next, processing executed by the information processing apparatus 1 will be explained with reference to FIG. 3 to FIG. 14.

First, metadata generation processing executed by the information processing apparatus 1 will be explained with reference to a flowchart of FIG. 3.

In Step S1, the content information acquisition unit 26 acquires content information. Specifically, the content information acquisition unit 26 acquires content information transmitted from not-shown broadcast stations through the digital broadcasting reception unit 21. The content information acquisition unit 26 also acquires content information transmitted from the server 4 and the like through the internet 3 through the network reception unit 22. The content information acquisition unit 26 accumulates the acquired content information to the content information accumulation unit 27.

In Step S2, the content keyword information generation unit 28 generates content keyword information. Specifically, the content keyword information generation unit 28 reads out content information accumulated in the content information accumulation unit 27. The content keyword information generation unit 28 classifies character strings in, content information according to words by referring dictionary data accumulated in the dictionary data accumulation unit 29 and performing morphological analysis of the read-out content information, thereby extracting important words among them as content keywords.

The content keyword information generation unit 28 sets scores in the content of extraction source with respect to the extracted content keywords based on attributes of the extracted content keywords and appearance frequency and appearance positions in content information. For example, in the case that scores are set based on the appearance frequency of content keywords, when the same content keyword appears three times in one content information, a score three-times as much as a score given at each appearance is given to the content keyword. For example, in the case that scores are set based on the appearance position, the content keyword appeared in a program title will have higher score than the content keyword appeared in the summary of the program. For example, in the case that scores are set based on attributes of content keywords, keywords of proper names or personal names will have higher scores than keywords of common noun or verbs.

The content keyword information generation unit 28 generates content keyword information having a vector data structure with respect to each content, in which content keywords extracted from content information of the content are elements and in which values based on scores corresponding to respective content keywords are weights, accumulating the information in the content keyword information accumulation unit 30.

The processings of Step S1 and Step S2 are executed for acquiring, for example, new content information.

In Step S3, the category metadata generation unit 31 determines whether category metadata is generated or not. For example, when content keyword information of a certain amount or more is accumulated anew in the content keyword information accumulation unit 30, when a certain period of time has passed since category metadata was generated on the last occasion, or when a command of generating category metadata is inputted by the user using the remote controller 2 and the like, the category metadata generation unit 31 determines that category metadata is generated and the process proceeds to Step S4.

In Step S4, the category metadata generation unit 31 generates category metadata. Examples of category metadata are shown in FIG. 4 to FIG. 7. The category metadata is data showing the relation between categories used for classification of contents and category determination keywords used for identifying categories to which contents belong.

The category includes two hierarchies of a category section 1 and a category section 2. The categories belonging to the category section 1 (hereinafter, referred to as large categories) are defined based on, for example, program category large classification described in a content descriptor of EIT. The categories belonging to the category section 2 (hereinafter, referred to as small categories) are categories in which the large categories are classified in more detail, which are defined based on, for example, program category middle classification described in a content descriptor of EIT.

As category determination keywords, contents keywords which are recognized to be highly related to respective categories are set by processing such as text mining and pattern recognition with respect to content keyword information. The category determination keywords are also set based on, for example, the relation between respective content keywords and categories to which contents from which content keywords are extracted belong. For example, an example in which "diplomacy", "policy" and "prime minister" are set as category determination keywords corresponding to a small category "politics/Diet" belonging to a large category "news" is shown in FIG. 4.

In FIG. 4 to FIG. 7, an example is shown, in which the number of category determination keywords corresponding to one small category is three in maximum, however, the maximum number can be the number other than three.

The category metadata generation unit 31 accumulates the generated category metadata in the category metadata accumulation unit 32.

In Step S3, when it is determined that category metadata is not generated, the processing in Step S4 is skipped and the process proceeds to Step S5.

In Step S5, the user preference metadata generation unit 38 determines whether user preference metadata is generated or not. For example, when it is set that contents are classified by using the user preference metadata as well as when a certain period of time has passed since the user preference metadata was generated on the last occasion, or when a command of generating user preference metadata is inputted by the user using the remote controller 2 and the like, the user preference metadata generation unit 38 determines that the user preference metadata is generated and the process proceeds to Step S6.

In Step S6, the user preference metadata generation unit 38 acquires operation history accumulated in the user operation history accumulation unit 37.

In step S7, the user preference metadata generation unit 38 generates user preference metadata. Specifically, the user preference metadata generation unit 38 detects contents which were operation objects for the user in a certain period of time (for example, last one month), for example, contents in which recording reservation, recording, playback, deletion and the like are performed (hereinafter, referred to as operation object contents) based on the operation history, and reads out content keyword information of the detected contents from the content keyword information accumulation unit 30.

The user preference metadata generation unit 38 extracts user's preferences with respect to respective contents based on the operation contents for respective operation object contents. The user preference metadata generation unit 38 extracts content keywords included in content keyword information of respective operation object contents as user preference keywords. The user preference metadata generation unit 38 gives importance to the extracted user preference keywords based on the degree of user's preference with respect to the operation object content of the extraction source. The value of the importance is set to be higher with respect to the user preference keyword representing user's preference more prominently. The user preference metadata generation unit 38 generates user preference metadata in which respective user preference keywords are associated with the importance, and accumulates the generated user preference metadata in the user preference metadata accumulation unit 39.

The method of extracting user's preference is not limited to a specific method, and it is desirable to apply a method whereby user's preference can be extracted more precisely.

In Step S5, when it is determined that user preference metadata is not generated, the processing of Step S6 and Step S7 is skipped and the process proceeds to Step S8.

In Step S8, the topic ranking metadata generation unit 40 determines whether topic ranking metadata is generated or not. For example, when it is set that contents are classified by using the topic ranking metadata as well as when a certain period of time has passed since the topic ranking metadata was generated on the last occasion, or when a command of generating topic ranking metadata is inputted by the user using the remote controller 2 and the like, the topic ranking metadata generation unit 40 determines that the topic ranking metadata is generated and the process proceeds to Step S9.

In Step S9, the topic ranking metadata generation unit 40 acquires topic ranking information. Specifically, the topic ranking metadata generation unit 40 acquires through the server 4 topic ranking information distributed from newspaper sites or various portal sites which are previously registered by the user through the internet 3 and the network reception unit 22.

In Step S10, the topic ranking metadata generation unit 40 generates topic ranking metadata. Specifically, the topic ranking metadata generation unit 40 extracts topic ranking keywords among the acquired topic ranking information. The topic ranking metadata generation unit 40 gives importance with respect to the extracted topic ranking keywords based on appearance frequency and the like in the topic ranking information. The topic ranking metadata generation unit 40 generates topic ranking metadata in which the extracted topic ranking keywords are associated with the importance, and accumulates the data in the topic ranking metadata accumulation unit 41.

In the information processing apparatus 1, it is also preferable to acquire topic ranking keywords from sites on which ranking of recent topics or trends are inserted without extracting topic ranking keywords.

After that, the process returns to Step S1, and the processing after the Step S1 is executed.

In Step S8, when it is determined that the topic ranking metadata is not generated, the processing in Step S9 and Step S10 is skipped, and the process returns to Step S1, and the processing after the Step 1 is executed.

Next, content classification processing executed by the information processing apparatus 1 will be explained with reference to a flowchart of FIG. 8. The processing is started when, for example, a command of classifying contents is inputted by the user using the remote controller 2 and the like.

In Step S21, the category identification unit 71 identifies categories to which contents belong. Specifically, the category identification unit 71 reads out content keyword information of contents of classification objects from the content keyword information accumulation unit 30. The category identification unit 71 also reads out category metadata from the category metadata accumulation unit 32.

The category identification unit 71 calculates the degree of association between respective contents and respective small categories by extracting content keywords corresponding to category determination keywords set in the small categories whose degree of association are calculated among content keywords of the contents and summing scores of the extracted content keywords. The category identification unit 71 extracts small categories whose degree of association is a certain threshold value or more as the small categories to which respective contents belong.

When there are plural small categories whose degree of association is a certain threshold value or more in one content, it can be determined that the content belongs to all these small categories and it can be determined that the content belongs to the certain number of (for example, one category) small categories in order of higher degree of association. When there is not a small category whose degree of association is a certain threshold value or more, the content will be classified into, for example, a large category "others".

In the large category in which there is no small category thereunder, degrees of association between respective contents and the large category are calculated, and it is determined whether respective contents belong to the large category based on the calculated degrees of association.

As described above, all contents including contents in which categories to which the contents belong are not defined are classified into respective categories.

The category identification unit 71 supplies information indicating categories to which respective contents belong to the clustering unit 72.

In Step S22, the clustering unit 72 performs clustering processing. For example, the clustering unit 72 selects a small category to which the clustering processing is performed and calculates similarities between contents belonging to the selected small category based on Euclidean distance or cosine measure between content keyword information. The clustering unit 72 classifies the group of contents belonging to the selected small category into clusters based on the calculated similarities. The clustering unit 72 also extracts content keywords representing features of respective clusters and sets the extracted content keywords to names of clusters.

At this time, for example, clustering processing may be performed to all small categories to which contents belong, or clustering processing may be performed only to small categories in which the number of contents belonging to the small categories is a certain value or more.

The clustering method used by the clustering unit 72 is not limited to a specific method. For example, the group of contents belonging to the small category may be classified into clusters of the certain hierarchies by using a hierarchical clustering method. For example, the group of clusters belonging to the small category may also be classified into the certain number of clusters, and further, clustering processing with respect to the group of contents belonging to respective clusters is repeated if necessary, using a non-hierarchical clustering method, thereby classifying the group of contents belonging to the small category into the certain hierarchies of clusters.

Figure 9:
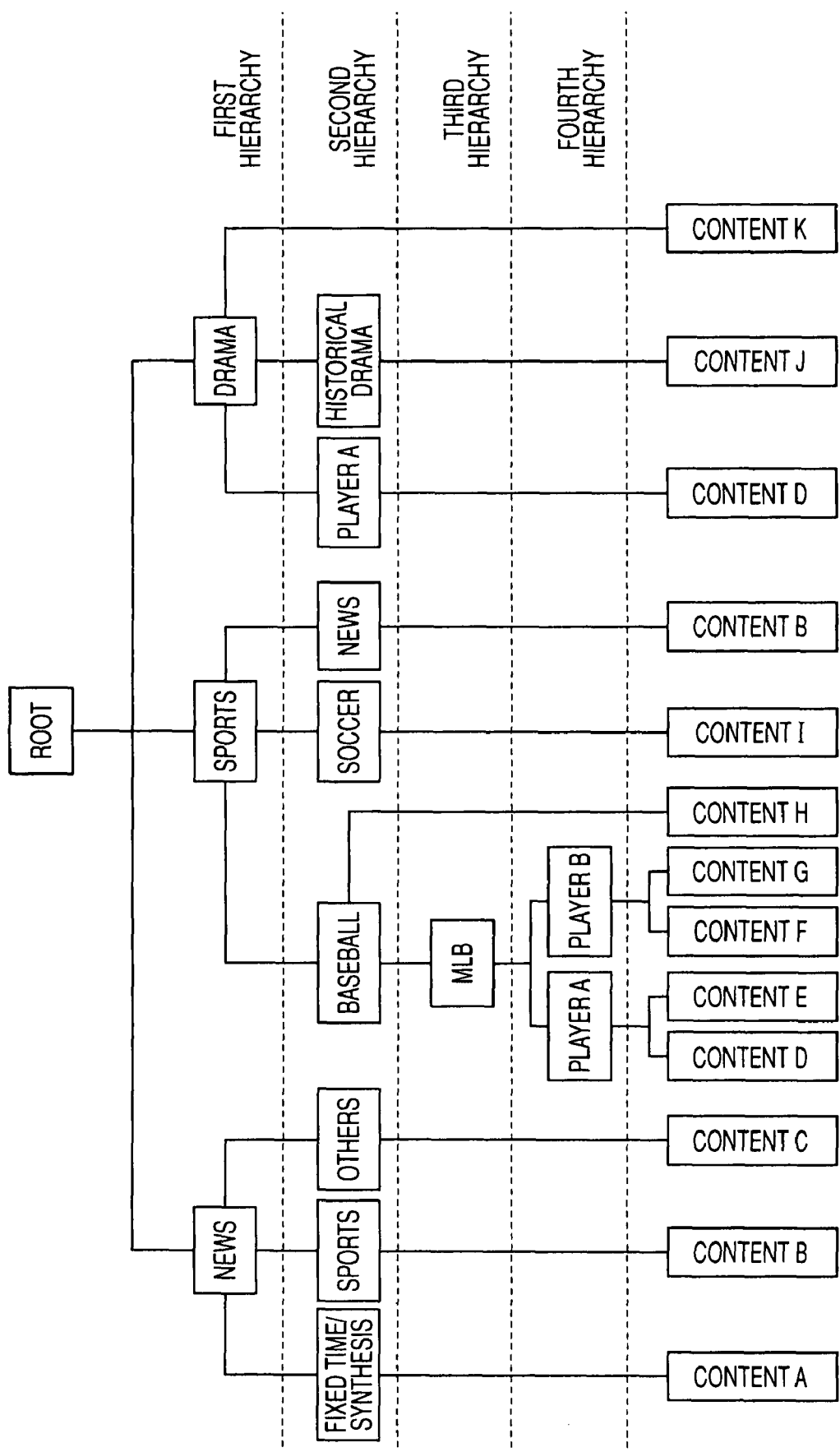
FIG. 9 is a view showing an example of a result of classifying contents.

FIG. 9 is a view showing an example of a result of classifying contents by the processing of Step S21 and Step S22. In the example of FIG. 9, a large category "news" in the first hierarchy is classified into three small categories "fixed time/synthesis", "sports" and "others" in the second hierarchy. A large category "sports" in the first hierarchy is classified into three small categories "baseball", "soccer" and "news" in the second hierarchy. A large category "drama" is classified into two small categories "player A" and "historical drama" in the second hierarchy. Moreover, the small category "baseball" in the second hierarchy is classified into a cluster "MLB" in the third hierarchy. The cluster "MLB" in the third hierarchy is classified into two clusters "player A" and "player B" in the fourth hierarchy.

In the example of FIG. 9, a content "A" belongs to the small category "fixed time/synthesis" under the large category "news", a content "B" belongs to the small category "sports" under the large category "news" as well as belongs to the small category "news" under the large category "sports", a content "C" belongs to the small category "others" under the large category "news", a content "D" belongs to the cluster "player A" under the cluster "MLB" under the small category "baseball" under the large category "sports" as well as belongs to the small category "player A" under the large category "drama", a content "E" belongs to the cluster "player A" under the cluster "MLB" under the small category "baseball" under the large category "sports", contents "F" and "G" belong to the cluster "player B" under the cluster "MLB" under the small category "baseball" under the large category "sports", a content "H" belongs to the small category "baseball" under the large category "sports", a content "I" belongs to the small category "soccer" under the large category "sports", a content "J" belongs to the small category "historical drama" under the large category "drama" and a content "K" belong to the large category "drama".

As described above, contents belonging to large categories or small categories are classified in more detail based on features of respective contents. In other words, contents are classified so as to be more detailed classification from abstract classification along the hierarchies. For example, the contents "D" to "H" belonging to the category "baseball" in the second hierarchy are classified into contents which belong to the cluster "MLB" and a content which does not belong to the cluster in the third hierarchy, and further, contents belonging to the cluster "MLB" in the third hierarchy are classified into contents which belongs to the more detailed cluster "player A" and contents which belongs the cluster "player B" in the fourth hierarchy.

When the clustering processing is performed to the whole contents all at once, it is difficult to grasp relations between the classified respective clusters, in other words, it is difficult to grasp that respective contents are classified to which clusters, as a result, it may be difficult to search desired contents. In the embodiment of the invention, the clustering processing is performed to the group of contents belonging to each category after respective contents are classified into predetermined categories, therefore, it is easy to grasp tendencies of contents which belong to respective clusters, as a result, it becomes easy to search desired contents.

When it is set that contents are classified by using user preference metadata, the clustering unit 72 performs clustering processing by setting scores of content keywords corresponding to user preference keywords accumulated in the user preference metadata accumulation unit 39 to be high based on weights of the user preference keywords. That is, the clustering unit 72 performs the clustering processing by attaching importance to a standpoint of user's preference. Accordingly, it is more likely that clusters which reflect user's preference are generated.

When it is set that contents are classified by using topic ranking metadata, the clustering unit 72 performs clustering processing by setting scores of content keywords corresponding to topic ranking keyword accumulated in the topic ranking metadata accumulation unit 41 to be high based on weights of the topic ranking keywords. That is, the clustering unit 72 performs the clustering processing by attaching importance to a standpoint of recent topics or trends. Accordingly, it is more likely that clusters reflecting recent topics and trends are generated.

Figure 10:
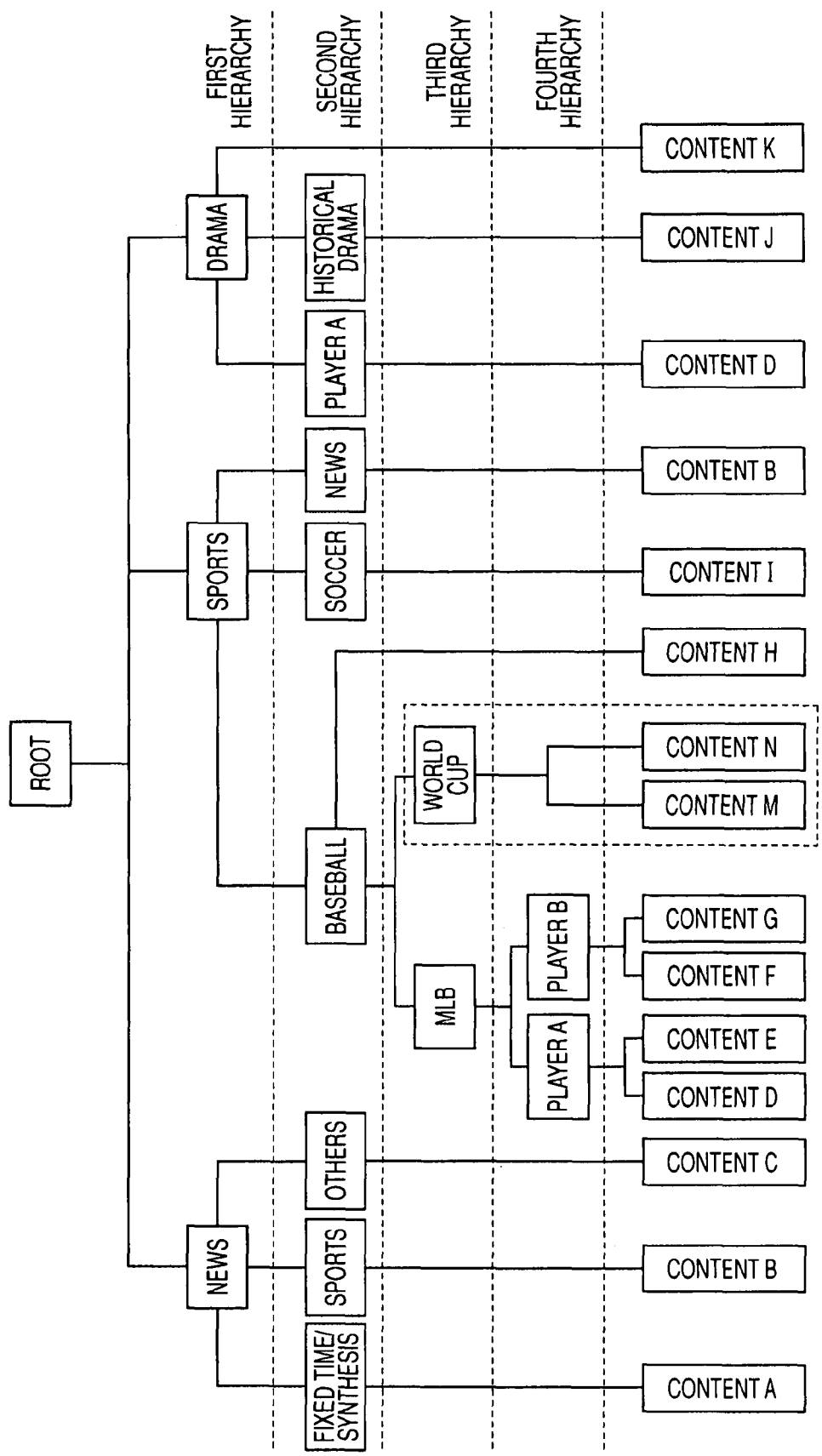
FIG. 10 is a view showing another example of a result of classifying contents.

FIG. 10 shows an example of a result of classifying contents by using user preference metadata and topic ranking metadata with respect to the same contents as the example shown in FIG. 9. In FIG. 10, comparing with FIG. 9, a cluster "world cup" is newly provided just under the small category "baseball" as shown by a portion surrounded by a dotted line in the drawing. The word "world cup" is one of the user preference keywords or the topic ranking keywords. That is, when the word "world cup" is the user preference keyword, the cluster "world cup" is the cluster reflecting user's preference, and when the word "world cup" is the topic ranking keyword, the cluster "world cup" is the cluster reflecting recent topics or trends. A content "M" and a content "N" belonging to the cluster "world cup" are contents which were not shown in FIG. 9, which belonged to the small category "baseball" or belonged to a cluster under the small category "baseball".

As described above, contents can be classified according to each user, reflecting user's preference, therefore, the search of contents preferred by each user can be easily performed. Also, contents can be classified by reflecting recent topics or trends, therefore, the search of contents relating to recent topics or trends can be performed easily.

The contents may also be classified by using both user preference metadata and topic ranking metadata.

The clustering unit 72 supplies information indicating contents belonging to respective clusters, cluster names of respective clusters and attributes of respective clusters to the hierarchical structure changing unit 73. The clustering unit 72, for example, sets an attribute of a cluster in which one of the user preference keywords is set as the cluster name to the cluster reflecting user's preference, and sets an attribute of a cluster in which one of the topic ranking keyword is set as the cluster name to the cluster reflecting recent topics or trends.

Returning to FIG. 8, in Step S23, the hierarchical structure changing unit 73 changes the hierarchical structure, if necessary. Specifically, for example, the hierarchical structure changing unit 73 changes the hierarchical structure so that contents belonging to small categories having a small number of contents are integrated to the large category which is in the high layer of the small categories. For example, in the example of FIG. 9, the hierarchy structure is changed so that the content "A" belonging to the small category "fixed time/synthesis", the content "B" belonging to the small category "sports" and the content "C" belonging to the small category "others" in the second hierarchy belong to the large category "news" in the first hierarchy directly. Accordingly, the number of hierarchies to be tracked until the contents "A" to "C" are searched can be decreased, as a result, the search of the contents "A" to "C" can be performed rapidly.

Figure 11:
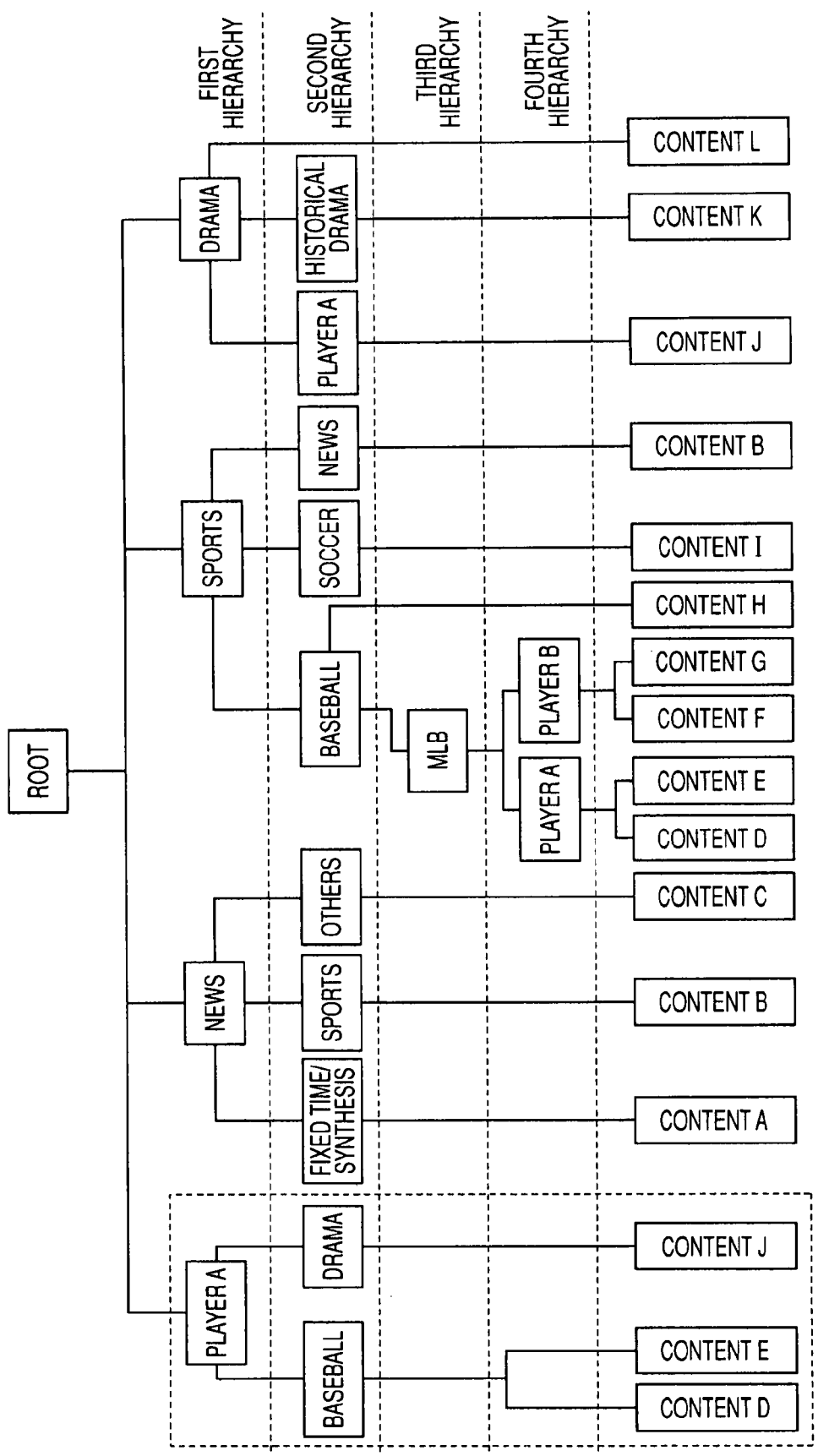
FIG. 11 is a view showing further another example of a result of classifying contents.

The hierarchical structure changing unit 73 is also arranges clusters reflecting user's preference or clusters reflecting recent topics or trends in the higher layer in the hierarchy. For example, in the hierarchical structure of FIG. 9, when the "player A" in the fourth hierarchy is the cluster reflecting user's preference, or the cluster reflecting recent topics or trends, the cluster "player A" is newly provided in the first hierarchy and the small category "baseball" which was in the high layer of the cluster "player A" in FIG. 9 is provided just under the cluster "player A" as shown in FIG. 11. The contents "D" and "E" are allowed to belong to the small category "baseball" under the cluster "player A". Moreover, the large category "drama" in the high layer of the small category "player A" which has the same name in the second hierarchy is newly provided just under the cluster "player A" in the first hierarchy. In addition, the content "J" is allowed to belong to the large category "drama" under the cluster "player A".

As described above, the cluster "player A" is arranged in the high layer and the route for searching contents relating to "player A" increases, therefore, it becomes possible to search contents relating to "player A" easily.

The hierarchical structure changing unit 73 accumulates content classification information indicating results in which respective contents are classified into categories and clusters in the content classification information accumulation unit 74.

Returning to FIG. 8, in Step S24, the content classification result display unit 43 displays a classification result of contents. Specifically, the content classification result display unit 43 reads out content classification information from the content classification information accumulation unit 74. The content classification result display unit 43 also reads out content information of contents to be displayed from the content information accumulation unit 27. The content classification result display unit 43 classifies contents according to categories and clusters by using the hierarchical structure including categories and clusters based on the content classification information and the content information and displays the contents on the display 24.

Figure 12:
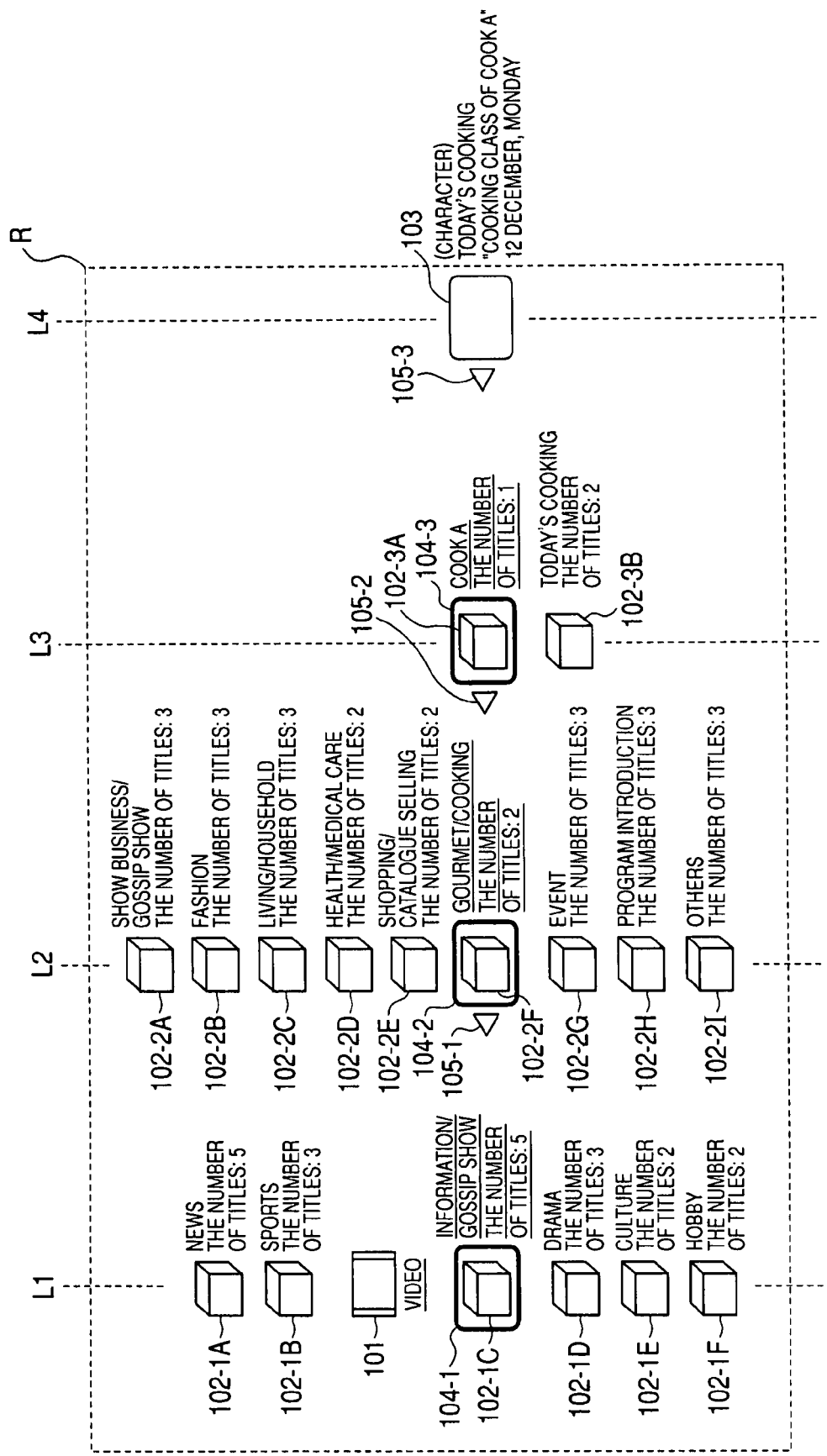
FIG. 12 is a view showing an example of a display screen of a result of classifying contents.
Figure 13:
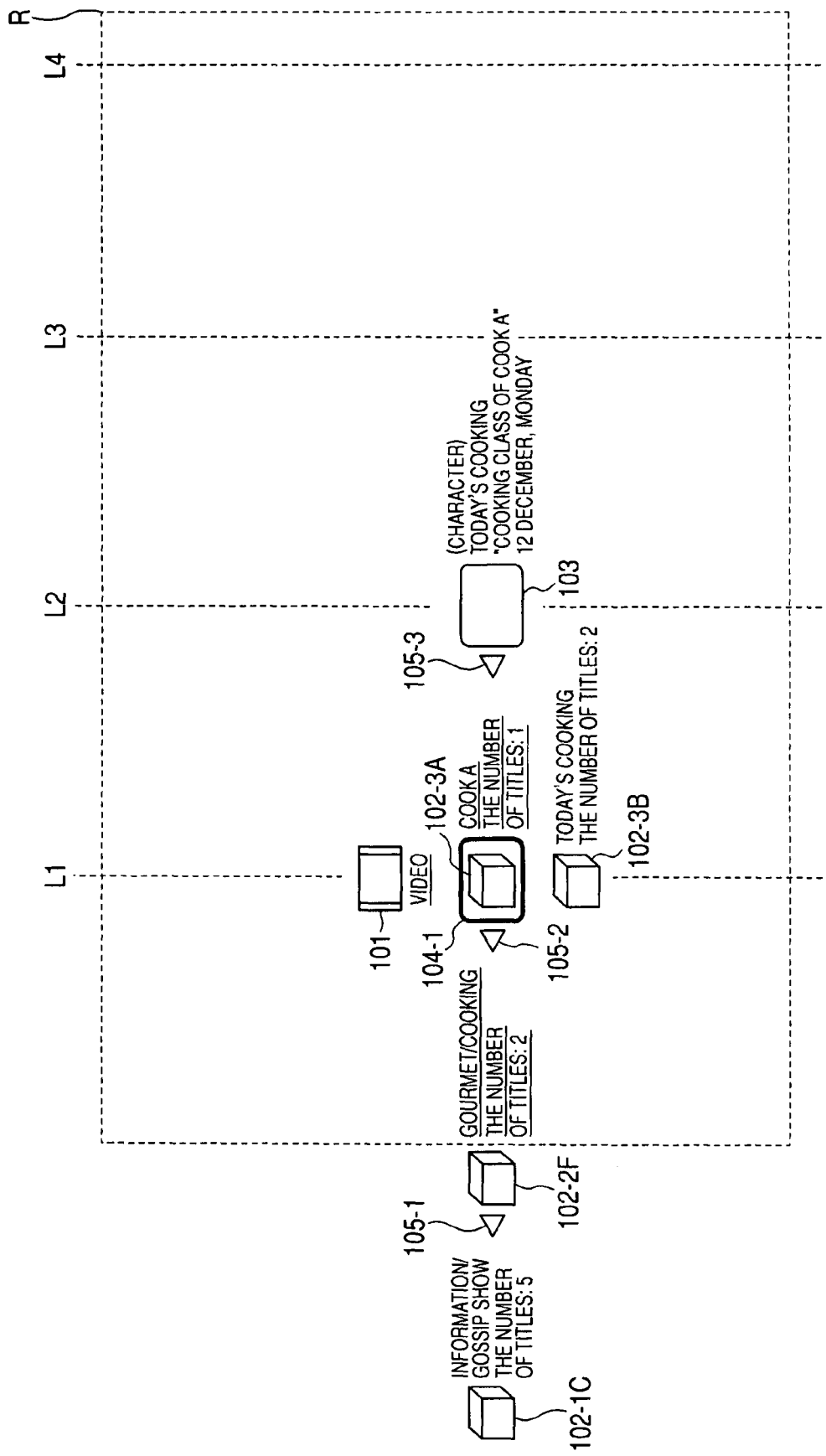
FIG. 13 is a view showing another example of a display screen of a result of classifying contents.
Figure 14:
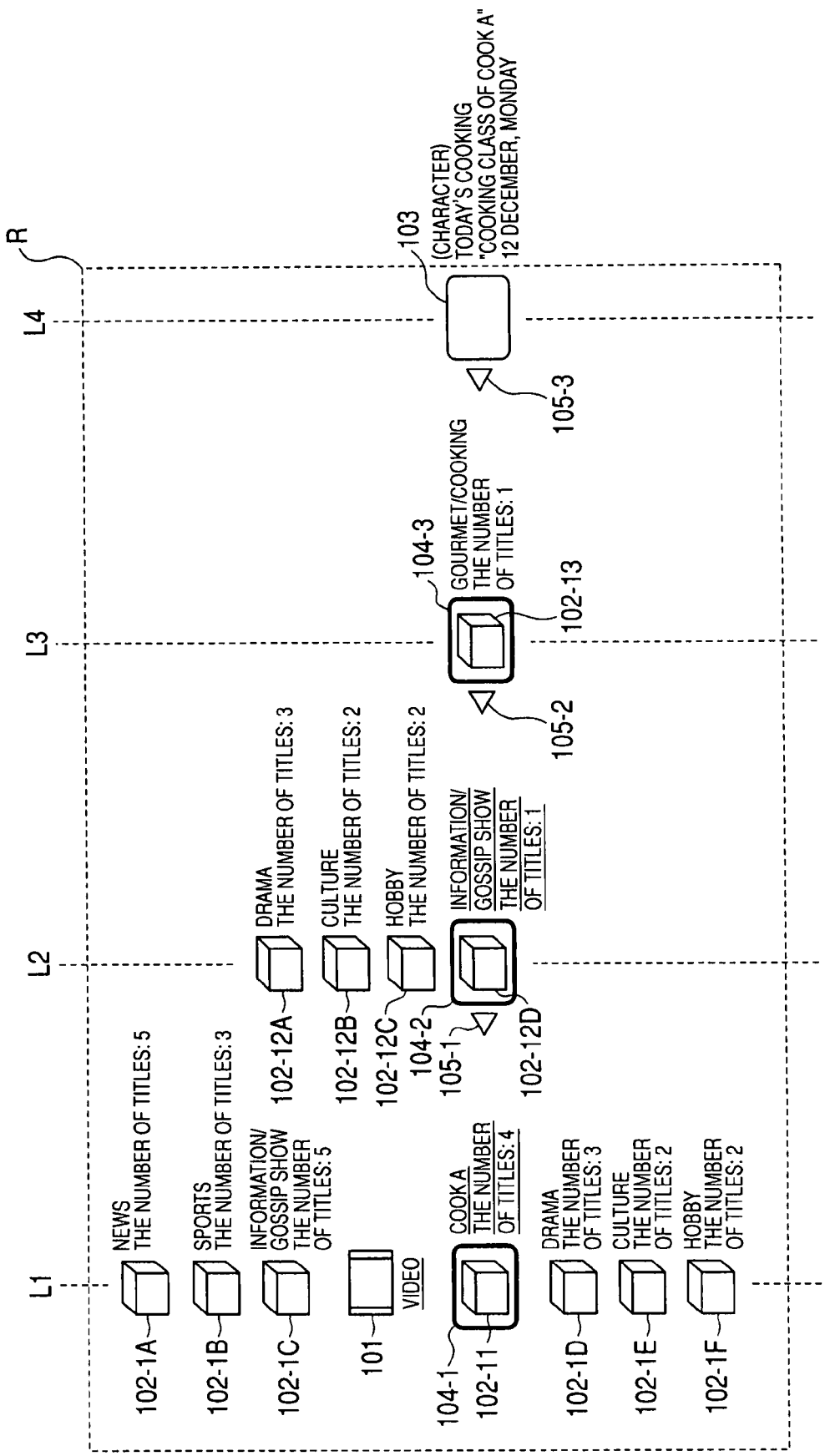
FIG. 14 is a view showing further another example of a display screen of a result of classifying contents.

FIG. 12 to FIG. 14 show examples of a display screen of the classification result of contents displayed on the display 24. FIG. 12 to FIG. 14 show examples displaying the result of content classification in a "video" folder in which recorded contents are accumulated. In FIG. 12 to FIG. 14, a region "R" surrounded by a dotted line is a region actually displayed on the display 24. Additionally, additional lines for indicating columns L1 to L4 in FIG. 12 to FIG. 14 are not actually displayed on the screen.

In the example of FIG. 12, an icon 101 indicating the "video" folder is displayed in the column L1, and icons 102-1A to 102-1F indicating large categories in the first hierarchy are displayed aligned in a longitudinal direction above and below the icon 101. The large category represented by the icon 102-1C among the icons 102-1A to 102-1F, which is displayed in a cursor 104-1 is the large category selected at present. That is, a large category "information/gossip show" is selected at present.

In a column L2 on the right side of the column L1, icons 102-2A to 102-2I indicating small categories in the second hierarchy belonging just under the large category "information/gossip show" selected at present are displayed aligned in the longitudinal direction. The small category represented by the icon 102-2F among the icons 102-2A to 102-2I, which is displayed in a cursor 104-2 is the small category selected at present. That is, a small category "gourmet/cooking" is selected at present. In addition, a mark 105-1 indicating that the small categories in the second hierarchy displayed in the column L2 belong just under the large category "information/gossip show" in the first hierarchy is displayed.

In the case that there are clusters or contents just under the large category in the first hierarchy selected at present, icons indicating the clusters or the contents are displayed aligned in the column L2 in the longitudinal direction with icons indicating small categories.

In a column L3 on the right side of the column L2, icons 102-3A and 102-3B indicating clusters in the third hierarchy belonging just under the small category "gourmet/cooking" selected at present are displayed aligned in the longitudinal direction. The cluster represented by the icon 102-3A in the icons 102-3A and 102-3B, which is displayed in a cursor 104-3 is the cluster selected at present. That is, a cluster "cook A" is selected at present. In addition, a mark 105-2 indicating that the clusters in the third hierarchy displayed in the column L3 belong just under the small category "gourmet/cooking" in the second hierarchy is displayed.

In the case that there are contents just under the small category in the second hierarchy selected at present, icons indicating the contents are displayed aligned in the column L3 in the longitudinal direction with icons indicating clusters.

In a column L4 on the right side of the column L3, an icon 103 indicating a content belonging to the cluster "cook A" selected at present is displayed. In addition, a mark 105-3 indicating that the content displayed in the column L4 belongs to the cluster "cook A" in the third hierarchy is displayed.

When there are plural contents which belong to the cluster in the third hierarchy selected at present, icons indicating respective contents are displayed aligned in the column L4 in the longitudinal direction. When there are clusters just under the cluster in the third hierarchy selected at present, icons indicating the clusters are displayed aligned in the column L4 in the longitudinal direction.

At right sides of icons 102-1A to 102-3B, category names of large categories or small categories represented by respective icons, or cluster names of clusters and the number of titles of contents belonging to large categories, small categories or clusters are displayed. Moreover, in character strings at right sides of icons selected at present, underlines are displayed for discriminating them from other icons. Instead of underlining them, color, chirography, background color and the like of character strings may be changed.

Furthermore, at the right side of the icon 103, information relating to the content represented by the icon 103 such as a title name, a broadcasting date is displayed.

In the screen shown in FIG. 12, the user can change the icon in the cursor 104-1 by moving the icons 102-1A to 102-1F displayed in the column L1 in upper and lower directions using the remote controller 2 and the like to select a desired large category. With the change of selection of the large category, icons indicating small categories, clusters and contents belonging under the large category which is newly selected are displayed in the column L2 to L4. When there are a lot of large categories in the first hierarchy and it is difficult to display all categories in one screen, icons indicating large categories which are not displayed in the screen can be displayed in the screen by moving icons in upper and lower directions.

The user can also moves icons on a row in which the marks 105-1 to the 105-3 are displayed, in this case, the icon 102-1C, the icon 102-2F, the icon 102-3A and the icon 103 in right and left directions by using the remote controller 2 and the like. FIG. 13 shows an example of a display screen when the icon 102-3A displayed in the column L3 in FIG. 12 is moved to the column L1, namely, the display screen when the icon in the third hierarchy is moved to the column L1. The user moves an icon of a desired hierarchy to the column L1, thereby selecting icons in the hierarchy. In the example of FIG. 13, clusters in the third hierarchy can be selected. In the case that there are a lot of hierarchies and it is difficult to display all hierarchies on one screen, icons belonging to hierarchies which are not displayed in the screen can be displayed in the screen by moving icons in the right and left directions.

As described above, contents are classified and displayed by using the hierarchical structure in which abstract classification becomes more detailed classification as the hierarchy proceeds from the high layer to the lower layer, therefore, as compared with the case in which a list of contents are displayed in a form of a table or a list, the user's interest can be narrowed down intuitively as well as candidate contents can be narrowed down by tracking hierarchies even when the user's interest is vague, as a result, desired contents can be searched easily.

FIG. 14 shows an example of a display screen indicating a result of classifying contents by using user preference metadata or the topic ranking metadata when the content keyword "cook A" is registered as the user preference keyword or the topic ranking keyword.

In FIG. 14, a point quite different from FIG. 12 is a point that the cluster "cook A" is arranged in the first hierarchy with large categories. That is, the icon 102-11 indicating the cluster "cook A" is displayed in addition to the icons 102-1A to 102-1F in the column L1 indicating large categories. In FIG. 14, an example in which the cluster "cook A" is selected in the first hierarchy is shown.

Also in FIG. 14, large categories and small categories arranged in the high layer of the cluster "cook A" in FIG. 12 are arranged under the cluster "cook A". That is, icons 102-12A to 102-12D indicating large categories belonging just under the cluster "cook A" is arranged in the column L2, aligned in the longitudinal direction, and an icon 102-13A indicating a small category belonging just under a large category "information/gossip show" selected in the second hierarchy is displayed in the column L3. In the column L4, the icon 103 indicating a content belonging to the cluster "cook A" under the small category "gourmet/cooking" under the large category "information/gossip show" is displayed.

Accordingly, contents relating to "cook A" which is one of content keywords indicating user's preference, or recent topics or trends can be searched more easily.

In FIG. 12 to FIG. 14, icons indicating categories in which there is not any content may not be displayed or also such icons may also be displayed.

According to the above, desired contents can be searched easily.

The embodiment of the invention can be applied to apparatuses, systems or software and the like which manage or display various contents by classifying them, such as a computer, a TV receiver, various types of recording/playback apparatus, a cellular phone, and a PDA (Personal Digital Assistant).

According to an embodiment of the invention, it is possible to classify contents whose content information can be obtained even if the contents is not actually accumulated in the information processing apparatus 1. For example, it is possible to classify contents accumulated in other apparatuses existing on a home network in the home, contents to be delivered in a content delivery service represented by a video-on-demand service utilizing digital broadcasting or Internet and contents accumulated in other apparatuses connected through the network such as Internet.

Moreover, the number of hierarchies into which contents are classified is not limited to the above example but can be values other than four hierarchies. However, when considering that the user searches contents while tracking hierarchies, it is conceivable that three hierarchies to five hierarchies are preferable.

In the above explanation, the example in which contents to be searched or classified are television programs has been explained, however, in an embodiment of the invention, in addition to movies, photographs, music and the like (moving pictures, still pictures or audio, or combination of these) which are generally called as contents, software or hardware which can be used by the user such as various information, documents, merchandise (including articles), and conversation can be searched and classified by using metadata indicating the details of contents. In the case that the content is hardware, for example, the article is projected into moving pictures, still pictures and the like to be data-processed, which is used as an object to be searched and classified as content data.

The series of processing described above can be executed by hardware as well as executed by software. When the series of processing is executed by software, programs included in the software are installed on a computer incorporated in a dedicated hardware, or for example, a general-purpose computer which is capable of executing various functions by installing various programs from program recording media.

Figure 15:
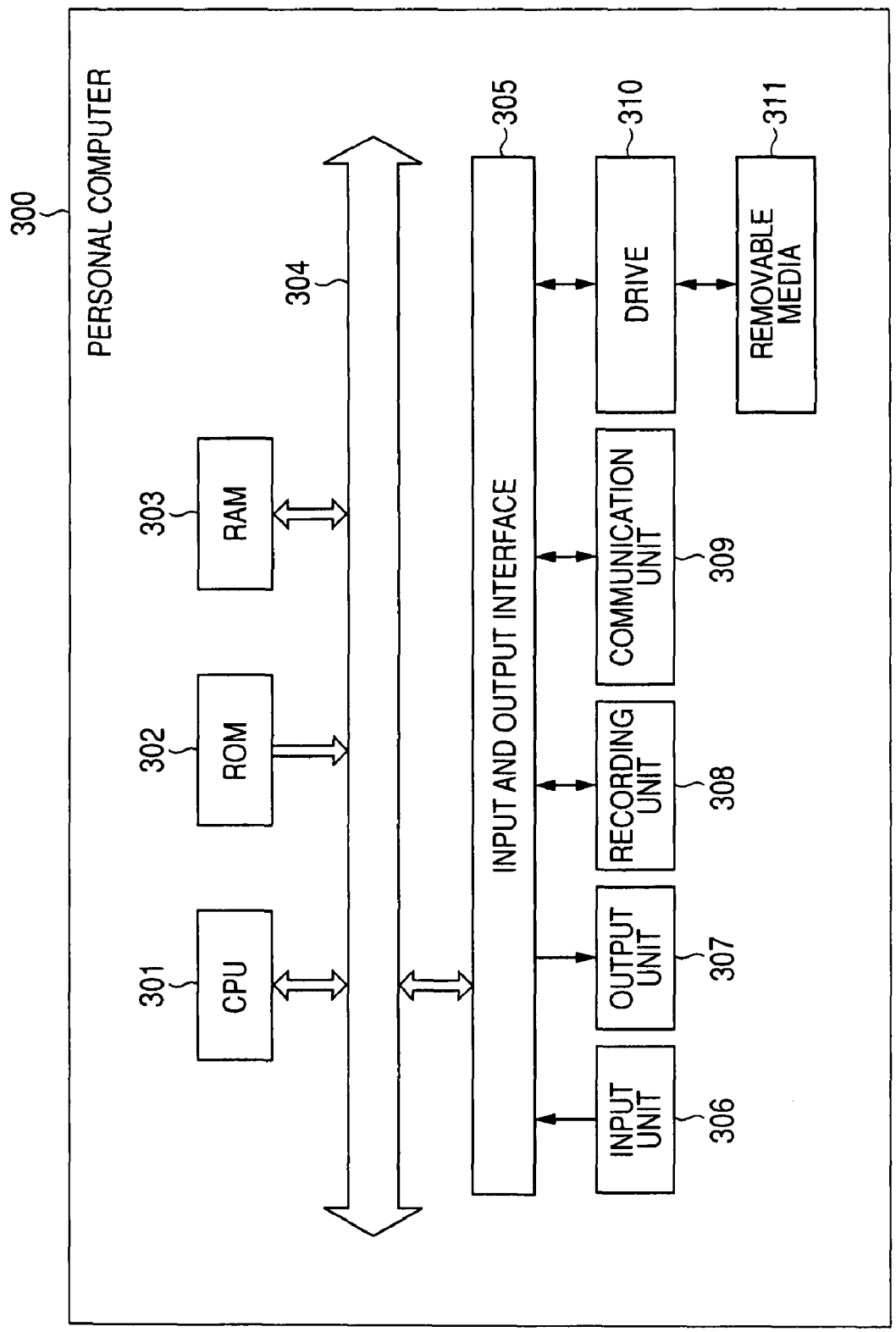
FIG. 15 is a block diagram showing an example of a configuration of a personal computer.

FIG. 15 is a block diagram showing an example of a configuration of a personal computer 300 executing the above series of processing according to programs. A CPU (Central Processing Unit) 301 executes various processing according to programs stored in a ROM (Read Only Memory) 302 or a recording unit 308. In the RAM (Random Access Memory) 303, programs executed by the CPU 301, data and the like are appropriately stored. The CPU 301, the ROM 302 and the RAM 303 are mutually connected by a bus 304.

An input and output interface 305 is also connected to the CPU 301 through the bus 304. An input unit 306 including a keyboard, a mouse, a microphone and the like, an output unit 307 including a display, speaker and the like are connected to the input and output interface 305. The CPU 301 executes various processing in response to commands inputted from the input unit 306. The CPU 301 outputs processing results to the output unit 307.

The recording unit 308 connected to the input and output interface 305 is formed by, for example, a hard disc, which stores programs executed by the CPU 301 and various data. An communication unit 309 performs communication with external apparatuses through networks such as Internet or local area networks.

The programs may be acquired through the communication unit 309 and stored in the recording unit 308.

A drive 310 connected to the input and output interface 305 drives removal media 311 such as a magnetic disc, an optical disc, a magneto-optical disc or a semiconductor memory when they are mounted on, and acquires programs, data and the like recorded therein. The acquired programs or data are transferred to the recording unit 308 if necessary and are stored therein.

The program recording media storing programs which are installed on a computer and made to be executed by the computer includes the removable media 311 which are package media such as the magnetic disc (including a flexible disc), the optical disc (including a CD-ROM (Compact Disc-Read Only Memory) and a DVD (Digital Versatile Disc)), the magneto-optical disc, and the semiconductor memory, the ROM 302 in which programs are stored temporarily or permanently, the hard disc forming the recording unit 308 and the like. Programs are stored in the program recording media by using wired or wireless communication media such as local area networks, Internet, and digital satellite broadcasting through the communication unit 309 as an interface such as a router and a modem as occasion demands.

In the specification, the steps of describing programs to be stored in the program recording media include not only processing performed in time series in the written order but also processing performed in parallel or individually if not always performed in time series.

The embodiment of the invention is not limited to the above embodiment but can be variously modified within a scope not departing from the gist of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
an identification means for identifying categories to which contents belong among predetermined categories based on category metadata indicating the details of the contents and extracted content keyword information; and
a clustering means for classifying a group of contents into clusters by performing clustering processing with respect to the group of contents belonging to the categories based on the metadata, wherein the clustering means supplies:
the classified group of contents into clusters,
names of the clusters, and
information indicating attributes of the clusters,
wherein the clustering means performs clustering processing by attaching importance to a standpoint of user's preference, and the information processing apparatus further comprising:
a hierarchical structure changing means for changing hierarchical structure so that the clusters reflecting user's preference are arranged in a higher layer in the hierarchical structure including the categories and the clusters.

2. The information processing apparatus according to claim 1,
wherein the clustering means performs clustering processing by attaching importance to a standpoint of recent topics or trends, and the information processing apparatus further comprising:
a second hierarchical structure changing means for changing hierarchical structure so that the clusters reflecting recent topics or trends are arranged in a higher layer in the hierarchical structure including the categories and the clusters.

3. The information processing apparatus according to claim 1, further comprising:
a display control means for controlling display of the contents so as to classify and display the contents according to the categories and the clusters by using the hierarchy structure including the categories and the clusters.

4. The information processing apparatus according to claim 1, further comprising:
a category metadata generation means for generating category metadata indicating the relation between keywords, which are extracted from the metadata of plural contents and used for identifying categories to which the contents belong, and the categories and
wherein the identification means identifies the clusters to which the contents belong based on keywords included in the metadata and the category metadata.

5. An information processing method, comprising the steps of:
identifying categories to which contents belong among predetermined categories based on category metadata indicating the details of the contents and extracted content keyword information; and
classifying a group of contents into clusters by performing clustering processing with respect to the group of contents belonging to the categories based on the metadata, wherein the clustering means supplies:
the classified group of contents into clusters,
names of the clusters, and
information indicating attributes of the clusters, wherein the clustering means performs clustering processing by attaching importance to a standpoint of user's preference, and the information processing apparatus further comprising:

a hierarchical structure changing means for changing hierarchical structure so that the clusters reflecting user's preference are arranged in a higher layer in the hierarchical structure including the categories and the clusters.

6. A computer-readable recording medium for storing a computer program executable by a processing unit for providing content classification, wherein said computer program comprises the steps of:

identifying, by the processing unit, categories to which contents belong among predetermined categories based on category metadata indicating the details of the contents and extracted content keyword information; and classifying, by the processing unit, a group of contents into clusters by performing clustering processing with respect to the group of contents belonging to the categories based on the metadata, wherein the clustering means supplies:

the classified group of contents into clusters, names of the clusters, and information indicating attributes of the clusters, wherein the clustering means performs clustering processing by attaching importance to a standpoint of user's preference, and the information processing apparatus further comprising:

a hierarchical structure changing means for changing hierarchical structure so that the clusters reflecting user's preference are arranged in a higher layer in the hierarchical structure including the categories and the clusters.

7. A content classification processing apparatus, comprising:

an identification unit identifying categories to which contents belong among predetermined categories based on category metadata indicating the details of the contents and extracted content keyword information; and a clustering unit classifying a group of contents into clusters by performing clustering processing with respect to the group of contents belonging to the categories based on the metadata wherein the clustering means supplies:

the classified group of contents into clusters, names of the clusters, and information indicating attributes of the clusters, wherein the clustering means performs clustering processing by attaching importance to a standpoint of user's preference, and the information processing apparatus further comprising:

a hierarchical structure changing means for changing hierarchical structure so that the clusters reflecting user's preference are arranged in a higher layer in the hierarchical structure including the categories and the clusters.

* * * * *